June 1, 1954
C. E. CHRISTOPHERSEN
2,679,993
AXIALLY TIGHTENING BAND CLAMP
Filed July 18, 1951
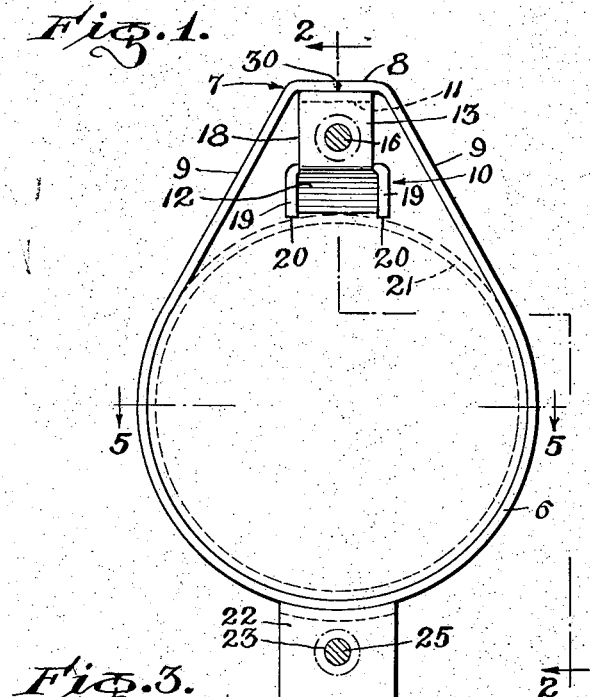
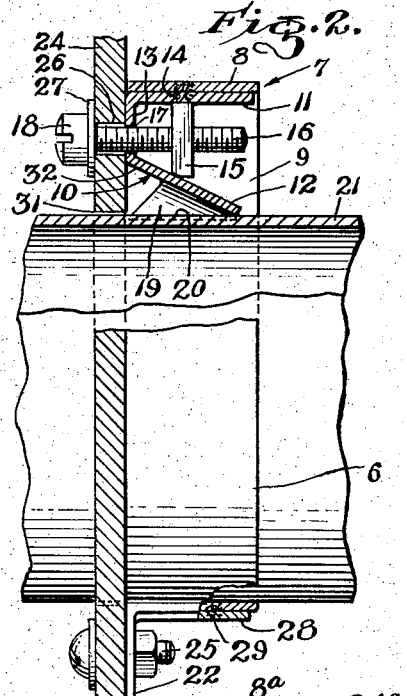
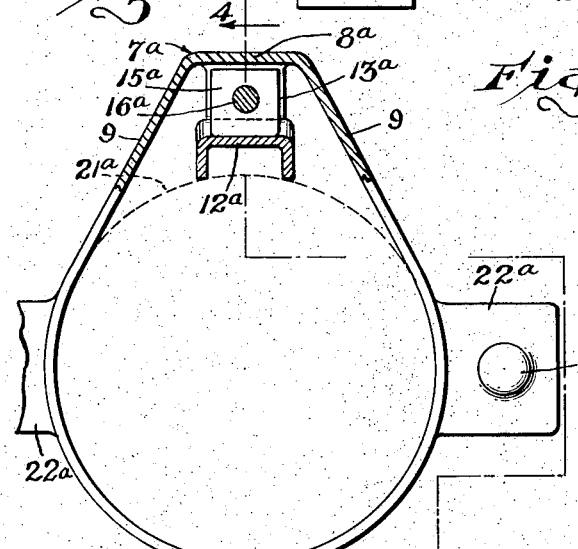
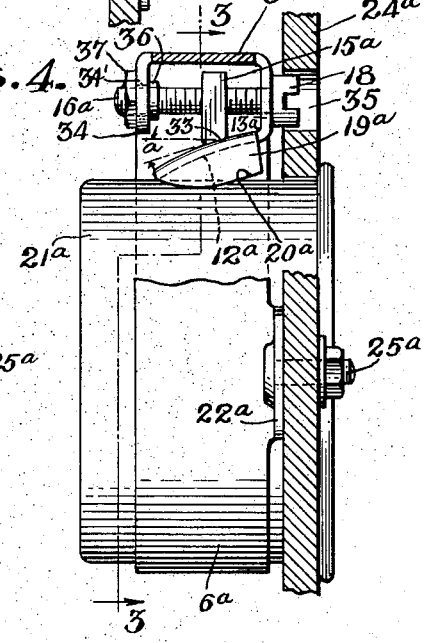
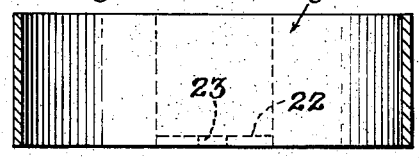
INVENTOR.
Clarence E. Christophersen
BY Lynn A. Latta
Attorney.

Patented June 1, 1954

2,679,993

UNITED STATES PATENT OFFICE 2,679,993

AXIALLY TIGHTENING BAND CLAMP

Clarence E. Christophersen, Inglewood, Calif., assignor to Marman Products Company, Inc., Inglewood, Calif., a corporation of California Application July 18, 1951, Serial No. 237,459

11 Claims. (Cl. 248—27)

This invention relates to band clamps. The general object of the invention is to provide a band clamp having tightening means including a rotatable actuator element disposed parallel to the axis of the clamp. A further object is to provide a band clamp which is suitable for mounting a round member (such as a measuring or indicating instrument) to a panel (e. g. an instrument panel) or which may be utilized in mounting any type of round or tubular member upon a panel or partition through which the tubular member extends on an axis at right angles to the plane of such panel or partition.

A further object is to provide such a band clamp, adapted to be attached to the rear side of an instrument panel and having an actuator which is accessible from the front side of the panel.

A further object is to provide such a band clamp which is of relatively simple and inexpensive construction. In particular, the invention contemplates a clamp which may be constructed in one piece as a sheet metal stamping, with the exception of an actuator screw and nut which are constructed as separate parts.

Other objects will become apparent in the ensuing specification and appended drawings in which:

Fig. 1 is a front view of a band clamp embodying the invention;

Fig. 2 is an axial sectional view thereof; installed upon a tubular member which is likewise shown partially in axial section; taken on the line 2—2 of Fig. 1;

Fig. 3 is a rear view of a modified form thereof, shown partially in cross-section, as indicated by the line 3—3 of Fig. 4;

Fig. 4 is a side view partially in axial section, taken as indicated by the line 4—4 of Fig. 3; and Fig. 5 is an axial sectional view taken on the line 5—5 of Fig. 1.

As an example of one form in which the invention may be embodied, I have shown in Figs. 1 and 2 my improved axially tightening clamp comprising generally a band including a semi-cylindrical loop portion 6 and a saddle portion 7 projecting radially outwardly from the extended circumference of loop portion 6, to embrace the actuator mechanism which will be described hereinafter. Saddle portion 7 includes a flat bridge member 8 constituting its outer extremity, and a pair of inwardly diverging side arms 9 which join the respective sides of bridge member 8 to loop portion 6, side arms 9 being tangent to loop portion 6.

The actuator mechanism comprises an expandable yoke 10, formed integrally of sheet metal and including spaced, diverging wedging arms 11 and 12 joined by a web member 13. Arm 11 is joined to the inner face of bridge member 8 by any suitable means, as by spot welds 14. Web member 13 constitutes a tab extending from the forward side of bridge member 8 radially inwardly toward the axis of loop portion 6, in a plane which is substantially coincident with the plane of the forward side of the band. Arm 12 constitutes a ramp which extends from the inner end of tab 13 diagonally toward the axis of the band and subtends relative to bridge element 8 (and the axis of the band) a dihedral angle less than 45°. The normal angle between arm 12 and bridge element 8, in the particular embodiment shown in the drawing, may be in the neighborhood of 30°. Ramp 12 presents an inclined plane, opposed to the inner surface of bridge member 8, all cross-sections of which are parallel to the bridge member 8. Accordingly, the opposed inner faces of arm 12 and bridge member 8 may be engaged by the parallel opposite sides of a rectangular nut 15 which, under the pull of an actuator screw 16, operates as a wedge for spreading the arm 12 away from the bridge element 8, the opposite sides of the nut 15 maintaining full straight line contact with each of the arms 11 and 12.

Tab 13 is provided with an opening 17 through which actuator screw 12 loosely extends. Screw 16 has a head 18 to take the end load set up in the screw by the resistance of arm 12 to the advancing movement of nut 15 as the clamp is being tightened.

A pair of jaws 19, integrally formed on the respective sides of arm 12 and bent towards the axis of the band, in substantially parallel, spaced relation to each other, have parallel inner edges 20 adapted to engage the object 21 which is to be clamped. While the object 21, as disclosed in the drawing, is a portion of a tube, it will be understood that any round object, such as an instrument (21a in Fig. 4) may be clamped by the device.

Projecting radially from one side (e. g. the rear side) of the band is a bracket ear 22 having an aperture 23. The bracket ear 22 is disposed so that it may bear flatly against a partition member or panel such as the panel 24 shown in Fig. 2, and be secured thereto by a securing element such as the bolt 25, extended through an aperture in the panel and through the aperture 23.

Bracket ear 22 is preferably positioned diametrically opposite the tab 13, and the two are disposed in a common plane which preferably is substantially the plane of the front edge of the band. Thus the ear 22 and tab 13 may conjointly bear against the rear face of panel 24, with actuator screw 16 extending through an opening 26 in the panel and establishing end bearing engagement with the front side of the panel, through a washer 27. The screw 16 therefore has the secondary function of cooperating with bolt 25 in mounting the band on the panel 24. The end bearing engagement of head 18 through washer 27 functions both to draw tab 13 against the panel 24 and to take the reactive axial load developed in screw 16 by the wedging engagement of nut 15 against arm 12.

It will now be apparent that, with ear 22 and head 18 both located on the forward side of the band, the band may be installed with its forward edge in contact with the rear face of panel 24, drawn tightly thereagainst by bolt 25 and ear 22; with object 21 extending through a circular opening 31 in the panel 24, and with the head 18 of screw 16 disposed forwardly of panel 24 so that it may be accessible for actuation by a screw-driver or the like.

In the preferred form of the invention, ear 22 is formed as a part of an L-shaped bracket having a tab 28 secured, as by spot welding 29, to the outer wall of loop member 6. At this point, it may be noted that by forming the bracket 22, 28 and the expandable member 11, 12, 13 as separate parts which are spot welded or otherwise secured to the band 6, 7, it becomes possible to utilize simply a strip of ribbon metal, cut to a predetermined length, for constructing the band 6, 7. The ends of said strip may if desired be butt-welded together as indicated at 30 in Fig. 1, or may be secured together through the medium of the arm 11, spot welded to both end portions of the band, with said end portions meeting at the center of bridge member 8.

Jaws 19 are so shaped as to provide for a flexible portion of arm 12, extending, as indicated at 32, between the inner extremity of tab 13 and the adjacent extremities of jaws 19, which flexible portion 32 is adapted to be flexed or bowed toward the object 21 as nut 15 is drawn toward panel 24. Thus the straight inner edges 20 of jaws 19 may maintain full contact with article 21 at all times. The invention also contemplates constructing the arm 12 of a material having some elasticity (e. g. a mild spring steel) so that when the flexible portion 32 of the arm is bowed as above stated, it will be placed under spring tension which will constantly maintain a yielding spring loading of jaws 19. A component of this spring load will be applied axially against nut 15, to maintain a yielding axial load on nut 15 and actuator screw 16 resisting any tendency of the screw 16 to rotate under the effect of vibration. With the nut, actuator screw and jaws 19 thus spring loaded, the likelihood of the clamping mechanism coming loose over a period of time, is reduced to a minimum. Furthermore, where spring material is used, the arm 12 will spring back toward its original position when the nut 15 is relaxed, thus automatically releasing the article 21 from its clamping engagement.

Figs. 3 and 4 illustrate how any one or more of various features of the clamp may be modified. The various possible modifications shown in these figures, each indicated by a reference numeral corresponding to the reference numeral of the corresponding part or feature in Figs. 1 and 2, but with the exponent "a" added, are as follows: Tab 13a is integral with loop member 6a. The ends of the band 7a are butt-welded together at the center of loop 6, as indicated at 30a. Thus the band, the bracket ears 22a and the tab 13a and ramp 12a may be integrally formed as a single sheet metal stamping. The ramp 12a, instead of being straight and flat, is arched from end to end thereof as indicated in Fig. 4, the curvature being such that the angle of inclination of the inclined surface of ramp 12a at its line of contact with nut 15a (which angle is indicated at "a" in Fig. 4) remains substantially constant for all positions of the nut and ramp. Nut 15a has a bevelled side face 33, subtending the angle "a" with the axis of screw 16, for bearing against the ramp 12a. The engaging edges 20a of jaws 19a are of rocker shape, as shown, so as to remain tangent to the surface of instrument 21a at the points of contact therewith. Bolts 25a have their heads permanently secured, as by welding, to ears 22a, so as to constitute fixed, threaded studs.

Nut 15a need not necessarily bear against the under side of bridge member 8a. As shown in Figs. 3 and 4, it clears the bridge member 8a and bears only against the arm 12a. Reactive radial loads on the nut 15a, developed by the wedging engagement of the nut against arm 12a, are transmitted through the respective ends of screw 16a to tab 13 and to a tab 34 which is parallel to tab 13a and extends radially inwardly from bridge member 8a on the opposite side of the band from tab 13. Tab 34 has an opening 34' in which is journalled a collar portion 36 of a nut 37 which is secured on the end of screw 16a. Nut 37 may be secured by staking or swaging the end of screw 16a into locking engagement with the nut. Thus the nut 37 constitutes a second head which provides end bearing engagement with tab 34 to give a back-off function, i. e., to cause the screw to forcibly move nut 15a away from engagement with arm 12a when rotated in reverse. Head 18 of the screw may, in this arrangement, be received in an opening 35 in panel 24a, or be aligned with such opening 35 so that a screw driver may be inserted therethrough to operate the actuator screw.

It will be understood that any or all of the modified features shown in Figs. 3 and 4 may be embodied in the clamp shown in Figs. 1 and 2, in modification thereof, without departing from the invention, or, conversely, the clamp shown in Figs. 3 and 4 may be modified by substituting for one or more features thereof, equivalent features in Fig. 1, such as, for example, having the bracket ears 22a and tab 13a formed separately and welded to the band.

I claim:

1. In an axially tightening band clamp, a closed band including a loop portion and arch shaped saddle portion projecting radially outwardly from said loop portion, a tab projecting radially inwardly from the outer extremity of said saddle portion at one axial extremity of the band in a plane at right angles to the axis of said loop portion, a ramp constituting an integral continuation of and extending from the inner extremity of said tab diagonally inwardly within in the space embraced by said saddle portion, for clamping engagement with an object disposed within said band, said tab having an aperture, an actuator screw extending through said aperture the longitudinal axis of said screw being disposed in a plane of said loop portion axis and having end bearing means for receiving axial loads from said band, and a nut threaded on said screw between said arm and said outer extremity of the saddle portion of said band, said nut having bearing engagement against the outer side of said ramp and operative when drawn toward said tab by said screw to exert a wedging action against said ramp to flex said ramp inwardly into clamping engagement with said object.

2. A clamp as defined in claim 1, including jaws extending toward the axis of the loop from the sides of said ramp, for establishing said clamping engagement with said article.

3. A clamp as defined in claim 2, wherein said jaws have straight inner edges for engagement with said article and wherein said ramp includes a flexible portion extending between said tab and the adjacent extremities of said jaws, which flexible portion is adapted to bow inwardly to accommodate inward movement of said jaws without requiring tilting movement of said straight edges, whereby the latter may maintain full engagement with said article in various positions of inward projection of said jaws.

4. A clamp as defined in claim 1, wherein said ramp is provided with a jaw projecting toward the axis of said loop portion from each side of said ramp, said jaws having rocker shaped inner edges for engagement with said article.

5. A clamp as defined in claim 1, wherein said ramp presents an inclined wedging face of convexly arched contour from end to end thereof, for bearing engagement with said nut, whereby the angle of inclination of said bearing surface at the area of contact with said nut may remain substantially unchanged while said ramp flexes to varying angles of inclination relative to the axis of the clamp.

6. A clamp as defined in claim 1, wherein said ramp is of channel section, including a web portion presenting an inclined bearing face for engagement by said nut and a jaw portion projecting toward the axis of the clamp from each side of said web portion said jaws having inner extremities for clamping engagement with said article.

7. A clamp as defined in claim 1, wherein said nut has bearing engagement with the inner face of the outer extremity of said saddle portion of the band, for taking the reactive radial load against said nut developed in its wedging engagement with said ramp.

8. A clamp as defined in claim 1, including a second tab projecting inwardly from said outer extremity of the saddle portion of the band, said actuator screw having an end portion journalled in each of the tab members for taking the reactive load against said nut developed by its wedging engagement with said ramp.

9. A clamp as defined in claim 1, wherein said ramp and tab are formed as a separate part including, in addition to said ramp and tab, an arm extnding substantially at right angles to said tab from the outer end thereof and permanently secured to the inner side of said outer extremity of the saddle portion of the band, said nut having bearing engagement with the inner faces of said arm and ramp in order to distribute between them loads developed in said nut as the result of its wedging engagement with said inclined ramp.

10. A band clamp as defined in claim 1, including a bracket ear extending radially outwardly from said band, said bracket ear and tab lying in substantially the plane of one axial extremity of the band, whereby said band may be mounted upon a panel member with said one axial extremity substantially abutting one side of the panel.

11. A band clamp as defined in claim 1, including a bracket ear extending radially outwardly from said loop portion of the band at a point diametrically opposite said tab, for attachment of the band to a supporting panel, said bracket ear and tab being disposed in a common plane adjacent one axial extremity of the band, said actuator screw adapted to extend through the panel, said screw having a head adapted to establish end bearing engagement with the front side of the panel for drawing said tab against the rear side of the panel for securing the band to the panel, and for taking the reactive load developed in said screw by the wedging engagement of said nut against said ramp.

References Cited in the file of this patent

UNITED STATES PATENTS

| Number | Name | Date |
| --- | --- | --- |
| 470,344 | Baldwin | Mar. 8, 1892 |
| 916,932 | McMurtrie | Mar. 30, 1909 |
| 941,906 | Beardsley | Nov. 30, 1909 |
| 1,270,927 | Clancy | July 2, 1918 |
| 1,497,549 | Conradi | June 10, 1924 |
| 1,561,432 | Hitchcock | Nov. 10, 1925 |
| 2,529,173 | Moyer | Nov. 7, 1950 |

FOREIGN PATENTS

| Number | Country | Date |
| --- | --- | --- |
| 291,734 | Germany | May 5, 1916 |
| 465,851 | Germany | Sept. 27, 1928 |
| 754,564 | France | Nov. 9, 1933 |